ively mostly as a coating layer thereon and the essentially linear polyurethane film is then formed on the cured polymer film with no textile sheeting layer being employed.

United States Patent

[11] 3,620,811

| [72] | Inventors | Richard T. Morrissey<br>Cuyahoga Falls;<br>Nelson C. Hess, Akron, both of Ohio |
|------|-----------|-------|
| [21] | Appl. No. | 873,601 |
| [22] | Filed     | Nov. 3, 1969 |
| [45] | Patented  | Nov. 16, 1971 |
| [73] | Assignee  | The B.F. Goodrich Company<br>New York, N.Y. |

[54] SUPPLE POROMERIC LAMINATE
3 Claims, No Drawings

[52] U.S. Cl. .................................................. 117/76 T,
117/63, 117/135.5, 117/140 A, 117/161 KP
[51] Int. Cl. ................................................... B44d 1/14,
D06n 3/08
[50] Field of Search ............................................ 117/135.5,
161 KP, 63, 140 A, 76 T, 161 UT, 161 UD; 161/88

[56] References Cited
UNITED STATES PATENTS

| 2,715,588 | 8/1955 | Graham et al. ................ | 117/140 X |
| 3,067,482 | 12/1962 | Hollowell ..................... | 117/140 X |
| 3,067,483 | 12/1962 | Hollowell ..................... | 117/140 X |
| 3,100,721 | 8/1963 | Holden ........................ | 117/135.5 |
| 3,208,875 | 9/1965 | Holden ........................ | 117/135.5 |
| 3,317,335 | 5/1967 | Marrinan et al. ............. | 117/76 X |
| 3,384,502 | 5/1968 | Japs ............................. | 117/140 X |

*Primary Examiner*—William D. Martin
*Assistant Examiner*—Theodore G. Davis
*Attorneys*—Albert C. Doxsey and J. Hughes Powell, Jr.

ABSTRACT: Previous poromeric laminates comprise a nonwoven substrate impregnated with from 50 percent to 200 percent by weight of fiber of a synthetic polymer, a textile sheeting interlayer, and a top film of an essentially linear polyurethane adhered thereto. Marked improvement in the softness, suppleness and drapeability of the material are found when the impregnant polymer is not placed entirely as an impregnant or saturant in the substrate mass, but is instead mainly spread and cured as a coating layer thereon and the essentially linear polyurethane film is then formed on the cured polymer film with no textile sheeting layer being employed.

SUPPLE POROMERIC LAMINATE

BACKGROUND OF THE INVENTION

Poromeric materials, synthetic laminated composite structures with the appearance of leather and with the ability to breath or transpire water vapor as does the natural product, leather, are being developed. A typical poromeric structure comprises a needled synthetic nonwoven textile substrate, generally uniformly impregnated with a polymeric solution or a polymeric latex, an intermediate layer of woven fabric, and a top film of an essentially linear polyurethane or a mixture of a polyurethane and a vinyl polymer such as polyvinyl chloride. Materials of this nature are described in U.S. Pat. No. 3,460,969 issued Aug. 12, 1969 and are found to be particularly useful in the manufacture of uppers for men's shoes. Hand sewn shoes, such as moccasins, require very supple leathers when made from the natural product. The poromeric material just described is too stiff for this use. Women's shoes and slippers are generally made from lighter weight, that is, thinner and less dense, materials than men's standard weight shoes. Leather clothing, including jackets, gloves, skirts and the like, is generally made from only the most supple and drapeable hides available. Attempts to make hand sewn shoes, ladies' weight shoe uppers and glove and jacket materials from the above described poromeric laminates have suffered in the past because of the inherent weight and stiffness of the material which is partly due to the presence of the woven interlayer and partly due to the high level of substrate impregnation that is employed and to the uniformity of the substrate impregnation through the thickness and width of the substrate. If the woven interlayer is omitted from the laminate structure described above, the product is a poromeric material, but it then lacks the dimensional stability and, in some cases, the tensile strength, demanded of leather and poromeric materials in the manufacture of lightweight shoes, jackets, and the like. The problem of orange peel in poromeric laminates prepared by impregnating and coating a fibrous web is the development of a pattern on the surface when the material is placed under tension, as by pulling down over a shoe last. This pattern is believed to result from needling the nonwoven substrate before it is impregnated. Needling is important to increase the density and strength of the nonwoven substrates and, at present, is a necessary step. Short length fibers may be added to the coating polymer solution to further reduce orange peel. Another approach is to add a blowing agent and foam the layer in situ. Another feature desired in the poromeric material is to have the density of the substrate vary through the thickness of the substrate with the most dense layer near the top surface and the least dense layer near the bottom surface of the substrate. This feature is important to the hand and plumpness of the material and to the piping and vamp break properties of a shoe upper material.

Two important characteristics of a leatherlike material are suppleness and moisture vapor transmission (MVT).

Suppleness has been defined as bending stiffness in pounds per square inch obtained by dividing the cantilever value by the cube of the thickness of the material and is measured by the cantilever test in ASTM D1388–55T. For shoe uppers materials with suppleness in the range 50–300 p.s.i. may be useful, but values of less than about 30 p.s.i. are generally needed for clothing items.

Moisture vapor transmission (MVT) is run by the test described in Federal Specifications on Leather; Methods of Sampling and Testing, Specification Number kk–L–311 a,Method 8011. Results are reported as grams transmitted per square meter per 24 hours. A satisfactory MVT value is 150 or more g./sq. m./24 hours.

SUMMARY OF THE INVENTION

It has been discovered that supple, strong, poromeric materials, comprising a nonwoven textile substrate and an essentially linear polyurethane top film, can be made satisfactorily without a woven fabric interlayer if the substrate's polymeric impregnant, as shown in the prior art, is essentially prevented from impregnating the nonwoven substrate, but is, instead, spread on the surface of said substrate as a viscous film, and cured to the state of a dried poromeric film before an essentially linear polyurethane top film is applied thereon to form the complete laminated poromeric structure. This is accomplished by increasing the viscosity of the polymer to be applied to the substrate and by prewetting the substrate. Curing of this layer contributes to product strength, helps to hide orange peel, and improves adhesion of the cover layer to the nonwoven layer. The product of this invention is extremely supple, has excellent hand and drapeability and is adaptable to the manufacture of lightweight materials for ladies' shoes, slippers, hand sewn shoes, and uppers for men's shoes which are free from orange peel and have satisfactory piping and vamp break characteristics. Compositions of this invention have the same top film surface as those described in U.S. Pat. No. 3,460,969. They can be finished, dressed, dyed, colored and embossed in known manners as applied to leathers and thermoplastic films. It is optional to apply textile fiber flocks to either the coating layer as spread on the substrate, in which case no polyurethane layer is employed, or onto the freshly applied polyurethane layer to form a material with suedelike hand and feel. The fibers can be applied by known techniques for flocking such as the beater bar method. The fibers orient perpendicular to the surface on which they are applied and extend through to the substrate to insure permeability.

When nonwoven batts of the same material and fiber composition and the same dimensions and densities are subjected to immersion in a carboxylic butadiene-acrylonitrile latex bath as taught in U.S. Pat. No. 3,384,502, issued May 21, 1968, under uniform immersion and drying conditions, the following results are obtained.

| Sample | Percent binder or saturant | Thickness (mils) | Suppleness, p.s.i. | MVT g./sq.m./24 hours |
| --- | --- | --- | --- | --- |
| A | 0 | 88 | 9 | 1,076 |
| B | 13.5 | 79 | 12 | 1,004 |
| C | 18.5 | 82 | 15 | 1,022 |
| D | 34.6 | 78 | 32 | 973 |
| E | 76.0 | 80 | 46 | 923 |
| F | 113.0 | 81 | 63 | 805 |

Study of the data indicates that these synthetic batts impregnated with polymeric impregnants have suppleness and MVT values that make them useful as drapeable substitutes for clothing materials only if the impregnant level is kept below about 20 percent by weight of the textile fiber. Materials with higher weight percent impregnations have satisfactory MVT for both clothing and footwear, but are too stiff for most clothing items.

A typical poromeric laminate made under the teachings of U.S. Pat. No. 3,460,969 has a suppleness value of about 270. Suppleness values of materials of this invention, in contrast, range from about 19 to 30. Various soft leathers specially tanned for use in clothing manufacture and ranging in thickness from 0.054 to 0.064 inches have suppleness values ranging from about 3 to about 16.

The new materials of this invention can be made in heavier weights by increasing the amount of the interlayer polymer or top layer polymer, or both, and the product is then found to be suitable for the manufacture of shoe uppers for men's shoes with the added attractive feature that in said men's weight shoe upper material the factor of surface roughness or orange peel is reduced to minimal levels demanded by the market. The suppleness of these materials can be varied by changing the type of latex employed to form the interlayer and the viscosity of the said latex, and by varying the initial amount of water pickup on the substrate layer.

It has been the practice in the past, in preparing poromeric laminate structures of essentially linear polyurethane top films, woven fabric interlayers and nonwoven substrate layers, to uniformly impregnate the nonwoven fiber substrate with from 50 percent to 200 percent by weight of fiber of a synthetic polymer such as butadiene-styrene, butadiene-acrylo-nitrile, polyacrylonitrile, polybutadiene, lower alkyl poly-acrylates, polyvinylchloride and polyurethanes prepared by the reaction of a polyester or polyether with an aromatic diisocyanate and a chain extender containing at least two active hydrogen atoms. Carboxylic varieties of the above mentioned materials may be used. Carboxylic modifications of the above materials are readily prepared by including minor amounts of acrylic acid or methacrylic acid in the original monomers charged to the reactor. The key to the present invention is to change the position or location of this polymer and the role it plays in the laminated poromeric structure. Instead of being located as an impregnant throughout the nonwoven fiber batt, the polymer is spread as an intermediate cover layer on top of the nonwoven.

Care is taken to control the depth of penetration into the textile substrate. This layer of polymer is set and cured in a poromeric configuration rapidly enough that no more of it than an amount equal to about 20 percent by weight of the nonwoven fiber substrate is allowed to penetrate into the nonwoven fiber substrate. The method of cure varies with the polymer employed as the substrate coating, but may be any conventional mode for the given polymer as known to one skilled in the art. A butadiene-acrylonitrile latex is preferably chemically coagulated as in a calcium chloride bath, then heat cured. An acrylate polymer may be coagulated and cured by heat alone. Heat coagulation has been found to lead to lower MVT values than chemical coagulation. Alternatively, the cover layer is prevented from penetrating the substrate to a depth greater than ⅓ of the substrate thickness. The amount of polymer that does enter the nonwoven layer serves as an adhesive area to bond the cured polymer layer to the nonwoven and provides a variation in density between the upper ⅓ or so of the nonwoven layer which it impregnates and the lower ⅔ of said layer which is unimpregnated. If the nonwoven batt is about 80 mils thick, polymer impregnation into the nonwoven, as an adhesive and densifier, will optimally measure about 20 ±5 mils. The polymer layer, which was a uniformly distributed substrate impregnant in the prior art, is now a cover layer on the nonwoven substrate in this invention and becomes an intermediate layer in the total laminate structure when the top film about 20 mils of poromeric essentially linear polyurethane is applied. Depth of penetration into the substrate is controlled by varying the viscosity of the materials to be spread or the amount of water pickup on the substrate, or by placing a plastic scrim layer in the substrate. The fluid polymer is preferably spread at a Brookfield viscosity of 10,000–50,000 c.p.s. measured with number 5 spindle at 2.5 r.p.m. When the polymer viscosity is less than 10,000 c.p.s., the material penetrates the substrate to greater depths than one-third the height of the substrate layer, and the resulting materials have suppleness values in the range of prior art materials. Viscosity improvers that can be added to obtain the desired polymer viscosity include polyacrylate salts, finely divided pyrogenic silica, sodium carboxymethyl cellulose, gum arabic and the like. When a nonwoven backer of 60 percent polypropylene/40 percent rayon, fiber denier 1.5, 14.2 oz. per sq. yd., with a dry thickness of 60 mils is immersed in water to saturate it, then wringer squeezed so that the water pickup is 207 percent by weight of the fiber, variations in depth of penetration of the latex, with respect to viscosity changes, are observed. A 35 percent total solids carboxylic butadiene-acrylonitrile latex, Hycar 1571, B. F. Goodrich Chemical Company, is thickened to various viscosity levels with carboxymethyl cellulose, spread on the wet substrate by a doctor knife set at 0.005 inch above the thickness of the substrate. The coated fabric stands in air at room temperature for 20 seconds, then enters a 10 percent calcium chloride bath which coagulates the latex. A room temperature water wash is given and the coated fabric is dried after which the depth of penetration of latex into the nonwoven is measured under a microscope at 30X magnification. Depth of penetration varies with latex viscosity as follows:

| Viscosity (c.p.s.) | Penetration Depth (Mils) |
|---|---|
| 10,000 | 40–45 |
| 11,500 | 35 |
| 15,000 | 30 |

It is known in the art of coating fabrics, particularly with coatings comprising polyurethanes dissolved in organic solvents, to prevent the polyurethane solution from penetrating the fabric substrate by saturating the substrate with water prior to the coating step.

Another method that can be employed to vary the depth of penetration of the latex into the nonwoven substrate is to vary the amount of water pickup on the substrate before the latex is applied. A Hycar 1571 latex is adjusted to 11,500 c.p.s. as above, and is coated onto uniform pieces of the nonwoven substrate described above, but having varying amounts of water pickup by weight of fiber. The latex coating is coagulated in the 10 percent calcium chloride bath, washed and dried as described above.

| % Water pickup | Depth of penetration mils |
|---|---|
| 0 | 30–60 |
| 96 | 30 |
| 135 | 25–30 |
| 187 | 25 |
| 230 | 20 |

The essentially linear polyurethanes applied as the top film in the poromeric laminate structures formed in this invention are polyesterurethanes prepared by the teaching of U.S. Pat. No. 2,871,218 and polyetherurethanes prepared by the teaching of U.S. Pat. No. 2,899,411. They are applied as top films in the poromeric laminate by spreading as cloud point solutions at 45°–65° C. immersing in water to extract solvent and drying as described in U.S. Pat. No. 3,460,969. In the manufacture of these polyurethanes either a hydroxyl terminated polyester or a hydroxyl terminated polyether is mixed with an amount of a hydroxyl terminated chain extender plus an aromatic dissocyanate. The amount of diisocyanate employed is carefully controlled so that the available isocyanate groups are a stoichiometric match for the total hydroxyl groups present. This balancing of isocyanate and hydroxyl groups insures the formation of the polyurethane in essentially linear, long chain, high molecular weight configuration. The polyesterurethanes so formed are soluble in dimethyl acetamide, dimethyl formamide and tetrahydrofuran. Also useful in the formation of top films for these poromeric laminate structures are polyurethanes formed by chain extending a reaction product of at least one polyalkyleneether glycol and at least one diisocyanate with at least one compound having two active hydrogen atoms. Vinyl polymers such as polyvinyl chloride, polyvinyl butyral, polyacrylonitrile and copolymers thereof can also be dissolved mixed with the polyurethane in amounts less than 50 percent by weight of the polyurethanes described above.

The laminate structures of this invention are useful in the manufacture of shoe uppers, slippers, hand sewn, shoes, upholstery and, in the light weights some clothing articles such as jackets. The materials can be dyed, pigmented and colored in a variety of patterns and styles. They are readily embossed, buffed and top dressed to enhance hand and appearance by techniques well known in the art of leather and plastics finishing. These materials are readily adaptable to production of suedelike sheets which can be formed into the articles mentioned above. To produce a suedelike structure one can adhere fiber flock to the laminate of substrate and coating layer before the coating layer is cured. No polyurethane top film is used in this case. Alternatively, a layer of flock can be applied to the polyurethane top coating at the start of the air set period. Fiber flock can be applied by any standard technique such as with a beater bar or by electrostatic methods. The flocked surface can also be wet or dry sanded after the solvent extraction from the polyurethane film has been accomplished.

Substrates for the poromeric laminates of this invention are known in the art and include both woven and nonwoven materials, although nonwovens are preferred. Nonwoven batts may be made by carding, garneting, air-laying, water-laying and other methods known in the art. They preferably weigh about 4 to 15 ounces per square yard. They contain randomly distributed short staple fibers (½ inch to 4 or 5 inches in length) of about 1 to 3 denier. The batts are made in varying thicknesses and densities, and are often bonded together at fiber intersections by the application of a minor amount of binder adhesive which may be applied by spraying, immersion of similar means. Typical binder adhesives are the synthetic latices of butadiene-styrene, butadiene-acrylonitrile, and the lower alkyl acrylates, methacrylates and copolymers thereof. Binder polymer is usually present in an amount of 5 percent to 20 percent by weight of nonwoven fiber. Substrates employed in this invention preferably contain a minimum of binder polymer. It is optional to treat the substrate batt with from 1 percent to 10 percent by weight of fiber of known fabric softeners such as silicone emulsions (General Electric SM–55), stearic acid–ethylene oxide condensation products, nonionic polymer emulsions (Silkand 40, Onyx Chemical Company), and neutral softeners such as Irgamine RU–100 New (Geigy Chemical Corp.). Favored nonwoven fibers for the substrates employed in this invention include rayon, polyamide (nylon), polyester (polyethylene terephthalate), polypropylene, polyacrylonitrile and mixtures thereof.

DETAILED DESCRIPTION OF THE INVENTION

EXAMPLE 1

A linear polyesterurethane polymer is prepared by following the teaching of U.S. Pat. No. 2,871,218. First 1000 g. (1.0 mol.) of hydroxyl poly(tetramethylene adipate), molecular weight 1000, hydroxyl number 112, acid number 2.5, and 180 g. (2.0 mols.) of butanediol–1,4 are mixed in a heated autoclave with stirring for 15 minutes at 10 mm. pressure at 100° to 105° C. Next 750 g. (3.0 mols.) of diphenylmethane-p,p'-diisocyanate are added and stirred for 2 minutes. The melt is poured into lubricated metal trays and held in an oven at 140° C. for 3 hours.

A nonwoven batt, consisting of 60 percent polypropylene, 40 percent rayon, formed by carding and cross-laying technique from 1.5 denier, 1.5" long fibers, with a weight of 14.2 oz. per sq. yd., a thickness of 0.060", a density of 0.29 g./cc., needled to a level of 2300 punches per sq. in., is dipped in a neutral softener emulsion, Irgamine RU–100 New, Geigy Chemical Corp. and dried. It picks up 3 percent by weight of fiber of the softener. The softened nonwoven substrate is coated in a doctor knife apparatus with 5 mils of carboxylic butadiene- acrylonitrile (70/30) latex having 35 percent total solids and thickened to maintain its wet shape when spread as a coating. Viscosity of the latex is controlled by adding the following viscosity improver:

| Material | Parts by Weight |
| --- | --- |
| Water soluble polymer of acrylic acid cross-linked with 1% of a polyalkyl ether of sucrose having an average of about 5.8 alkyl groups for each molecule of sucrose* | 1.0 |
| Water | 99.0 |

*Carbopol 934.

B. F. Goodrich Chemical Company

The latex is thickened for spreading and compounded for curing by stirring in additives according to the following recipe:

| Material | Parts by Weight |
| --- | --- |
| Carboxylic butadiene-acrylonitrile latex | 45.0 |
| Zinc Oxide (as 50% total solids dispersed) | 5.0 |
| Viscosity improver (0.5 parts resin in 49.5 water) | 50.0 |

Enough ammonium hydroxide is added to adjust pH to 9 to 10. XThis takes about 1 part of 28 percent ammonium hydroxide.

Viscosity of the thickened latex is 15,000 c.p.s. (Brookfield viscometer, No. 5 spindle, 2.5 r.p.m.).

The nonwoven fabric is preferably singed to remove protruding fiber ends and fuzz. It is then saturated with water by immersion in a water bath and a run through rubber to metal rolls set at 13 pounds to remove free liquid water. The water pickup on the nonwoven is 237 percent by weight of the fiber weight. The wet nonwoven is again signed, and passes under a spreading knife set at a gap of 0.005 inch greater than the average thickness of the nonwoven for spreading of the thickened latex. The latex coated nonwoven substrate is allowed to air set for 20 seconds at 23° C., then passes through a 10 percent calcium chloride bath at 25° C. to coagulate the latex layer. The nonwoven fabric, coated with the thickened, coagulated latex, is washed for 30 minutes in water at 80° F. Excess water is removed by passing the laminate through squeeze rolls and the coated fabric is dried in an oven at 65° C. At this latex viscosity under the conditions employed it is found that a layer of about one mil of dry polymer is deposited on the nonwoven and that the latex, before drying has penetrated from 15–20 mils into the nonwoven to adhere to the 2 layers. The latex coating is then cured in an oven for 5 minutes at 275° F.

The laminate is readily dyed with 1:2 metallized acid dyes. A deep brown shade is obtained from Derma Brown 2R, C.I. Acid Brown 129 (Sandoz Chemical Company). The dye bath is held about 150° F.; the laminate remains in the bath about 30 seconds. It is passed through squeeze rolls external of the bath to remove excess bath liquor and dried.

After dyeing the laminate is finish coated, typically with an ethyl acrylate–acrylonitrile latex system. For the brown dyed material the finish is pigmented brown by the addition of a 50 percent total solids dispersion of iron oxide pigment in water, the dispersion being added at the rate of about 25 percent on the basis of the total solids of the acrylic latex. The finished laminate is dried in an air oven. After final drying, the laminate is embossed between nip rolls with the pattern roll heated to about 220° F. and a clear nitrocellulose top dressing coat is spread from solvent at the rate of 0.030 oz. per sq. yd.

Suppleness and MVT of the material are measured at various stages of the process to insure that leatherlike values are maintained.

| Process stage | MVT (g./m.²/ 24 hours) | Suppleness (p.s.i.) |
| --- | --- | --- |
| Substrate spread with thickened latex and cured | 1,045 | 12 |
| After polyurethane film application | 442 | 21 |
| After dye application | 751 | 25 |
| After top dressing | 283 | 34 |
| After embossing | 253 | 33 |

The laminate is cut into a set of patterned pieces for shoe uppers. When these pieces are fastened to the shoe lasts and pulled down over the lasts, no orange peel develops at the surface. Shoes made with complete uppers of this material show the characteristic vamp break of leather. The valleys of the vamp area have the fine piping creases characteristic of top quality tanned leather.

EXAMPLE 2 the nonwoven substrate material of example 1 is employed in batt form. It contains 237 percent water base on the fiber weight. A coating composition is made up to the following recipe:

| Material | Parts |
| --- | --- |
| Heat reactive acrylic latex (46.6% total solids) (terpolymer of ethyl acrylate, butyl acrylate and acrylonitrile) | 100 |
| Water soluble polymer of acrylic acid cross-linked with 1% of a polyalkyl ether of source having an average of about 5.8 alkyl groups for each molecule of sucrose. | X0.5 |
| Water to dilute to 40% total solids | 34 |
| Ammonium hydroxide to pH 6.5 | 1.0 |

This material has a Brookfield Viscosity with No. 6 spindle at 20 r.p.m. of 28,000 c.p.s.

The coating layer is spread on the water saturated nonwoven, which is singed before and after the water saturation, at a wet thickness of 30 mils to give a dry thickness of 6 mils. A 1.0 denier nylon flock is spread on the freshly coated layer and adhered thereto by the beater bar technique. Excess flock is removed by vacuum. The flocked material is dried one hour at 212° F., then heated one-half hour at 250° F. to heat cure the acrylate latex.

The cured sample has the look and feel of suede leather. A 1,000 cycle crocking test gives no flock loss in the dry state and only a very slight loss in the wet state. The MVT is 795 g./sq.m./24 hours. Tested on the Bally flexometer, with 30,000 flexes being acceptable, the material runs 40,000–68,000 flexes without failure. Flock adhesion by a coin rub test is excellent.

We claim:

1. The method of making a poromeric laminate structure comprising coating a substrate layer of nonwoven fabric with a layer of a synthetic vinylidene polymer latex selected from the group consisting of butadiene–styrene, butadiene–acrylonitrile, carboxylic butadiene–acrylonitrile and polybutadiene, said polymer penetrating said substrate only up to a maximum of ⅓ the total depth of said substrate, coagulating said polymer layer in an adhering configuration with said substrate layer, curing said polymer layer, coating said polymer layer with a film of an essentially linear polyurethane as a cloudpoint solution in dimethyl formamide, immersing said structure in a water bath to remove dimethyl formamide leaving said polyurethane in a poromeric configuration and drying said structure.

2. The method making a poromeric laminate structure comprising coating of substrate layer of nonwoven fabric with a layer of a carboxylic butadiene/ acrylonitrile polymer latex, said polymer penetrating said substrate only up to a maximum of one-third the total depth of said substrate, coagulating said latex layer in an adhering configuration with said substrate layer be passing through a bath of salt solution, curing said latex layer be exposing it to a temperature of 275° F. for 5 minutes, coating said cured latex layer with a film of an essentially linear polyurethane as a cloudpoint solution in dimethyl formamide, immersing said structure in a water bath to remove dimethyl formamide leaving said polyurethane in a poromeric configuration and drying said structure.

3. The method of making a poromeric laminate structure comprising coating a substrate layer of nonwoven fabric with a layer of a carboxylic butadiene/acrylonitrile latex having a Brookfield viscosity of 10,000–50,000 c.p.s. (No. 5 spindle, 2.5 r.p.m.) whereby said latex penetrates said substrate to a maximum of one-third the thickness of said substrate, coagulating said latex layer in an adhering configuration with said substrate layer by passing through a bath of 10 percent calcium chloride solution, curing said latex layer by exposing it to a temperature of 275° F. for 5 minutes, coating said cured latex layer with a film of an essentially linear polyurethane as a cloudpoint solution in dimethyl formamide, immersing said structure in a water bath to remove dimethyl formamide leaving said polyurethane in a poromeric configuration and drying said structure.

* * * * *